US008832282B2

(12) United States Patent
Xie (10) Patent No.: US 8,832,282 B2
(45) Date of Patent: Sep. 9, 2014

(54) BARRIER BOUNDARY NODE AND METHOD FOR ESTABLISHING CONNECTION BETWEEN BARRIER BOUNDARY NODES (75) Inventor: Gang Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 342 days.

(21) Appl. No.: 13/063,591

(22) PCT Filed: Sep. 7, 2009

(86) PCT No.: PCT/CN2009/073795
§ 371 (c)(1),
(2), (4) Date: Mar. 11, 2011

(87) PCT Pub. No.: WO2010/028586
PCT Pub. Date: Mar. 18, 2010

(65) Prior Publication Data
US 2011/0173336 A1     Jul. 14, 2011

(30) Foreign Application Priority Data
Sep. 12, 2008 (CN) .......................... 2008 1 0211958

(51) Int. Cl.
G06F 15/16 (2006.01)
H04Q 11/00 (2006.01)
H04L 12/721 (2013.01)
H04L 12/773 (2013.01)
H04L 12/54 (2013.01)
H04L 12/911 (2013.01)
H04L 12/751 (2013.01)

(52) U.S. Cl.
CPC ............ H04L 45/60 (2013.01); H04Q 11/0062 (2013.01); H04L 45/62 (2013.01); H04L 12/5695 (2013.01); H04Q 2011/0073 (2013.01); H04L 47/783 (2013.01); H04L 45/02 (2013.01)
USPC ............ 709/228; 709/227; 709/243; 709/244

(58) Field of Classification Search
USPC .................................. 709/227, 228, 243, 244
See application file for complete search history.

(56) References Cited

U.S. PATENT DOCUMENTS

| 6,801,496 | B1 * | 10/2004 | Saleh et al. .................... 370/221 |
| 7,984,185 | B2 * | 7/2011 | Xu ................................. 709/245 |
| 2007/0160039 | A1 | 7/2007 | Xu | |

FOREIGN PATENT DOCUMENTS

| CN | 101060420 A | 10/2007 |
| CN | 101360349 A | 2/2009 |

(Continued)

OTHER PUBLICATIONS

English-language abstract of PCT Patent Application Publication No. WO 2007/0197727, Feb. 22, 2007.
"Architecture and Requirements for Routing in the Automatically Switched Optical Network," Draft ITU-T Recommendation G.7715/Y.1706, International Telecommunication Union, Geneva, Switzerland, May 21, 2002, pp. 1-32.

(Continued)

Primary Examiner — Liangche A Wang
Assistant Examiner — Cheikh Ndiaye
(74) Attorney, Agent, or Firm — DASCENZO Intellectual Property Law, P.C.

(57) ABSTRACT

The present invention discloses a block boundary node and a method for setting up a connection between block boundary nodes. The method comprises: an ingress boundary node querying and verifying block information of an ingress subnet point after receiving a connection setup request message, and sending a block information query request to an egress boundary node upon successful verification; the egress boundary node querying and verifying block information of an egress subnet point after receiving the block information query request, and sending the block information to the ingress boundary node upon successful verification; the ingress boundary node querying route by using the block information of the ingress subnet point and egress subnet point as query parameters, and sending a connection setup request message to the egress boundary node upon querying the route successfully; and the ingress boundary node receiving a connection setup acknowledgement message returned by the egress boundary node.

9 Claims, 6 Drawing Sheets (56) References Cited

FOREIGN PATENT DOCUMENTS

| EP | 1460808 | A2 | 9/2004 |
| EP | 1936911 | A1 | 6/2008 |
| WO | WO 2007/197727 | | 2/2007 |

OTHER PUBLICATIONS

Takeda, T., et al., "Diverse Path Setup Schemes in Multi-Domain Optical Networks," $5^{th}$ International Conference on Broadband Communications, Networks and Systems, Broadnets, IEEE, Piscataway, NJ, USA, Sep. 8, 2008, pp. 523-530.

* cited by examiner

BARRIER BOUNDARY NODE AND METHOD FOR ESTABLISHING CONNECTION BETWEEN BARRIER BOUNDARY NODES

TECHNICAL FIELD

The present invention relates to an intelligent optical network technology, and more particularly, to a block boundary node in an intelligent optical network and a method for setting up a connection between block boundary nodes.

TECHNICAL BACKGROUND

With the mass application of the intelligent optical network technology, the construction and development of a transport network have been developed from the single hardware transport technology to a comprehensive transport technology which integrates the network management technology, the control technology and hardware technology. With the help of a control plane of the intelligent optical network, the reliability of the network is improved and new bandwidth services, such as optical virtual private network (OVPN) and bandwidth on demand (BoD), can be provided quickly as well, thereby bringing improved efficiency and decreased cost for operation and maintenance of the network.

However, as types of the services are more and more various, the proportion of bandwidth, especially consumed by packet services, is higher and higher, and service granularity is more and more large as well. A synchronous digital hierarchy (SDH)/synchronous optical network (SONET) device which is designed originally for voice bearing has not well satisfied the development of future application, thus, the intelligent optical network has an unstoppable tendency to evolve from a SDH network to an optical transport network.

Transmission of large-granularity services challenges service grooming ability of a wavelength division multiplexing (WDM) node. Recently, a great breakthrough has been obtained in the reconfigurable optical add drop multiplexer (ROADM) technology, and the micro electromechanical system (MEMS)-based technology, such as wavelength selective switch (WSS), solves the problem of reconfigurability of an optical wavelength such that flexible up- and down-conversion and punch-through of the optical wavelength can be implemented to a certain extent. Furthermore, the ROADM is not required to use optical-electrical-optical (OEO) conversion in transmitting a signal from one network to another such that the cost of optical-electrical-optical conversion can be eliminated. Many factories in the industry have provided a WDM system with optical layer reconfigurable properties. In addition, in view of advantages of the OTN over the wavelength division system in terms of a definition of the node and end-to-end management, the OTN begins to appear on commercial transmission devices. Consequently, dynamic control requirements for wavelength/sub-wavelength are brought, as with an automatically switched optical network (ASON) for an add/drop multiplexer (ADM) of the SDH/SONET.

However, it is because the ROADM is not required to use the OEO conversion, only direction of the wavelength can be re-assigned and wavelength conversion cannot be performed such that it is not non-blocking completely in the wavelength conversion. Although an OEO conversion device can be introduced in the ROADM to implement the wavelength conversion, completely non-blocking wavelength conversion cannot be implemented due to the limitation of the cost and conversion capacity of the OEO devices.

Currently, there are two processing methods for block information described above. The first method is to notify each node of the block information by expending routing flood information and perform route computation taking the block information into consideration in order to ensure that the calculated route is interchangeable at each node. The success rate of setting up a connection between routes which is calculated by this method is high, but a lot of flood information is required to be added. The second method is not to flood the block information and not to reserve specific resources during forward signaling when the connection is established, but to give an available resource range and finally select resources to be used according to the previously given range at a target node. This method does not need to add additional flood information, but the success rate of setting up the connection between the calculated routes is low.

SUMMARY OF THE INVENTION

The present invention provides a block boundary node and a method for setting up a connection between block boundary nodes so as to reduce efficiently flood messages of block information on the premise of ensuring the success rate of connection establishment by processing separately block information of a boundary subnet point of a boundary node in a route domain and block information of a subnet point in the route domain.

The technical scheme of the present invention will be described below.

The present invention provides a block boundary node comprising a connection controller, a link resource manager and a route controller, wherein:

The connection controller is configured to send a block information query request to the link resource manager after receiving a connection request message and verify the queried block information of the home terminal, query block information of an egress boundary node after the verification is passed and send a route query request to the route controller by using the block information of the home terminal and the block information of the egress boundary node as query parameters.

The link resource manager is configured to feed the block information of the home terminal back to the connection controller in response to the block information query request of the connection controller.

The route controller is configured to provide route information for setting up a connection in response to the route query request.

Preferably, the connection controller is further configured to update the block information stored in the home terminal after receiving a block information updating message of the home terminal.

Preferably, the connection controller is further configured to receive a block information updating message of a distal boundary node and then update the block information of the egress boundary node stored in the home terminal according to the block information updating message of the distal boundary node.

The present invention provides a method for setting up a connection between block boundary nodes comprising the following steps:

A. an ingress boundary node querying and verifying block information of an ingress subnet point in an ingress subnet after receiving a connection setup request message, and sending a block information query request to an egress boundary node upon successful verification;

B. the egress boundary node querying and verifying block information of an egress subnet point in an egress subnet after receiving the block information query request, and sending the block information of the egress subnet point to the ingress boundary node upon successful verification;

C. the ingress boundary node querying route by using the block information of the ingress subnet point and egress subnet point as query parameters, and sending a connection request message to the egress boundary node upon querying the route successfully; and D. the ingress boundary node receiving a connection acknowledgement message returned by the egress boundary node, thus the connection establishment is complete.

Preferably, in the step A, the ingress boundary node verifies the connection setup request message after receiving the connection setup request message, queries and verifies the block information of the ingress subnet point in the ingress subnet if the verification is passed, and returns a connection request failure response if the verification is not passed, and the procedure ends.

Preferably, in the step C, the egress boundary node starts block information monitoring after receiving the connection request message; and in the step D, the ingress boundary node starts the block information monitoring after receiving the connection acknowledgement message.

Preferably, after the connection is established, the ingress boundary node updates the block information of the ingress subnet point of the home terminal stored locally when monitoring changes in the block information of the ingress subnet point of the home terminal.

Preferably, after the connection is established, the egress boundary node sends a block information updating message to the ingress boundary node when monitoring changes in the block information of the egress subnet point of the home terminal, and the ingress boundary node updates the block information of the egress subnet point of the egress boundary node stored locally according to the block information updating message.

Preferably, the ingress boundary node receives a connection release request and then ends the block information monitoring of the home terminal and sends the connection release request to the egress boundary node, and the egress boundary node ends the block information monitoring of the home terminal after receiving the connection release request and sends a connection release acknowledgement message to the ingress boundary node after processing the connection release request.

Compared with the prior art, the present invention processes separately block information of a boundary subnet point of a boundary node in a route domain and block information of a subnet point in the route domain so as to reduce efficiently flood messages of the block information on the premise of ensuring the success rate of connection establishment. Compared with the first method according to the prior art, the present invention can reduce efficiently invalid flood messages and maintain the same success rate of connection establishment, whereas compared with the second method according to the prior art, the present invention can improve the success rate of connection establishment significantly.

PREFERRED EMBODIMENTS OF THE INVENTION

The present invention processes separately block information of a boundary subnet point of a boundary node in a route domain and block information of a subnet point in the route domain so as to reduce efficiently flood messages of block information on the premise of ensuring the success rate of connection establishment.

As being similar to the block information of the subnet point in the route domain, the block information of the boundary subnet point of the boundary node in the present invention use the same data model with the block information of the subnet point in the route domain. However, unlike the block information of the subnet point in the route domain, the block information of the boundary subnet point of the boundary node is used in route computation only when the boundary subnet point of the boundary node is specified as an ingress/egress subnet point for the connection, and the block information of the boundary subnet point of the boundary node is invalid for other connections. Furthermore, after the connection is established, the block information of the ingress/egress subnet point of the boundary node is associated with only the connection which uses the subnet point.

Specific implementation of the present invention will be described in conjunction with the accompanying drawings below.

A boundary node in an intelligent optical network mainly comprises a connection controller (CC), a route controller (RC) and a link resource manager (LRM), roles of which will be described below.

The connection controller is responsible for coordinating the link resource manager, the route controller and the peer and subordination connection controller to manage and monitor the establishment and release of the connection and modify connection parameters of the existing connection.

The route controller is responsible for providing route information for setting up the connection, which may be end-to-end (e.g., source route) or hop-by-hop information, in response to a request from the connection controller and responding to a topology information (a subnet point and its abstract) request for network management.

The link resource manager is responsible for managing a subnet point pool (SNPP) link, including assigning and deassigning a subnet point link connection, and providing topology and state information. Because the subnet point pool (SNPP) link may be public or private, the link resource manager may also be public or be associated with a certain virtual private network (VPN).

Figure 1:
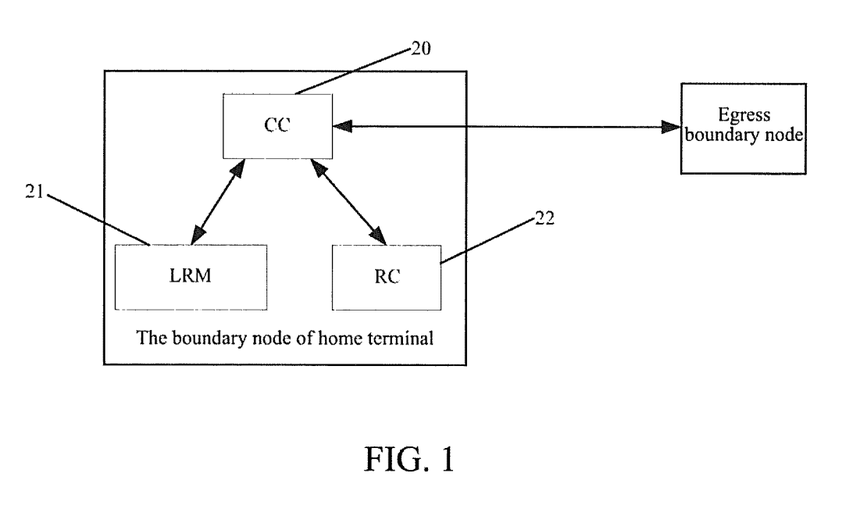
FIG. 1 is a block diagram of a block boundary node in accordance with the present invention.

Referring to FIG. 1, which is a block diagram of a block boundary node in accordance with the present invention comprising a connection controller, a link resource manager and a route controller, wherein, The connection controller 20 is configured to send a block information query request to the link resource manager 21 after receiving a connection request message and verify the queried block information of the home terminal, query block information of an egress boundary node after the verification is passed and send a route query request to the route controller 22 by using the block information of the home terminal and the block information of the egress boundary node as query parameters.

The connection controller 20 is further configured to update the block information stored in the home terminal after receiving a block information updating message of the home terminal and update the block information of the egress boundary node stored in the home terminal according to a block information updating message of a distal boundary node after receiving the block information updating message of the distal boundary node.

The link resource manager 21 is configured to feed the block information of the home terminal back to the connection controller 20 in response to the block information query request of the connection controller 20.

The route controller 22 is configured to provide route information for setting up the connection in response to the route query request.

Figure 2:
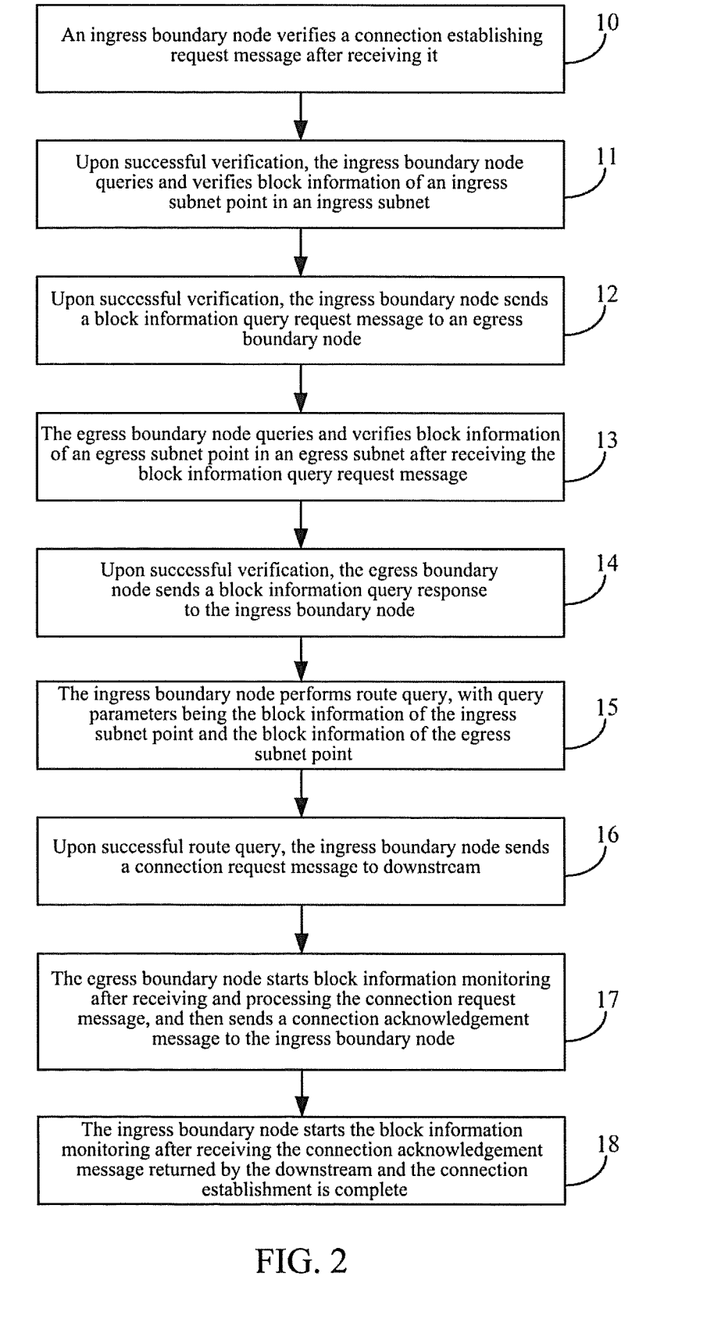
FIG. 2 is a flow chart of a method for setting up a connection between block boundary nodes in accordance with the present invention.

Referring to FIG. 2, which is a flow chart of a method for setting up a connection between block boundary nodes in accordance with the present invention, the main implementation process of the method will be described below.

Step 10, a connection controller of an ingress boundary node verifies a connection setup request message after receiving it.

Step 11, upon successful verification, the connection controller of the ingress boundary node queries block information of an ingress subnet point in an ingress subnet from a local link resource manager and verifies the information.

Step 12, upon successful verification, the connection controller of the ingress boundary node sends a block information query request message to a connection controller of an egress boundary node.

Step 13, the connection controller of the egress boundary node queries block information of an egress subnet point in an egress subnet from the local link resource manager and verifies it after receiving the block information query request message.

Step 14, upon successful verification, the connection controller of the egress boundary node sends a block information query response containing the verified block information of the egress subnet point in the egress subnet to the connection controller of the ingress boundary node.

Step 15, the connection controller of the ingress boundary node sends a route query request to a local route controller, with query parameters being the block information of the ingress subnet point and the block information of the egress subnet point.

Step 16, upon successful route query, the connection controller of the ingress boundary node sends a connection request message to downstream to continue the processing procedure of connection establishment.

Step 17, the connection controller of the egress boundary node notifies the local link resource manager to start block information monitoring after receiving and processing the connection request message, and then sends a connection acknowledgement message to the ingress boundary node.

Step 18, the connection controller of the ingress boundary node starts the block information monitoring after receiving the connection acknowledgement message returned by the downstream and the connection establishment is complete.

After the connection is established, when a link resource manager of the ingress boundary node monitors changes in the block information of the ingress subnet point of the home terminal, it will notify the local connection controller, which updates the block information of the ingress subnet point of the home terminal stored locally; when a link resource manager of the egress boundary node monitors changes in the block information of the egress subnet point of the home terminal, it will notify the local connection controller, and the connection controller of the egress boundary node sends a block information updating message to the connection controller of the ingress boundary node, which updates the block information of the egress subnet point of the egress boundary node stored locally according to the block information updating message.

After the connection is established, when the connection controller of the ingress boundary node receives a connection release message, it will verify the connection release message, notify the local link resource manager to end the block information monitoring if the verification is passed, and send a connection release request to the connection controller of the egress boundary node, which notifies the local link resource manager to end the block information monitoring after receiving the connection release request and sends a connection release acknowledgement message to the connection controller of the ingress boundary node after processing the connection release request.

Specific implementation of the present invention will be further described in detail through a specific embodiment below.

Figure 3:
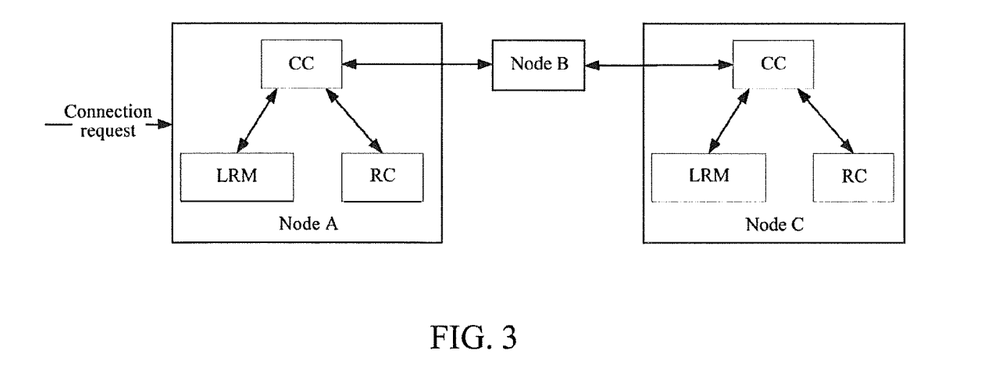
FIG. 3 is a schematic diagram of a network topology in accordance with an embodiment of the present invention.

Referring to FIG. 3, which is a schematic diagram of a network topology in accordance with the embodiment of the present invention, the figure represents a route domain, in which both node A and node C are boundary nodes, and node B is an intermediate node. The connection establishment direction is A→B→C.

Figure 4:
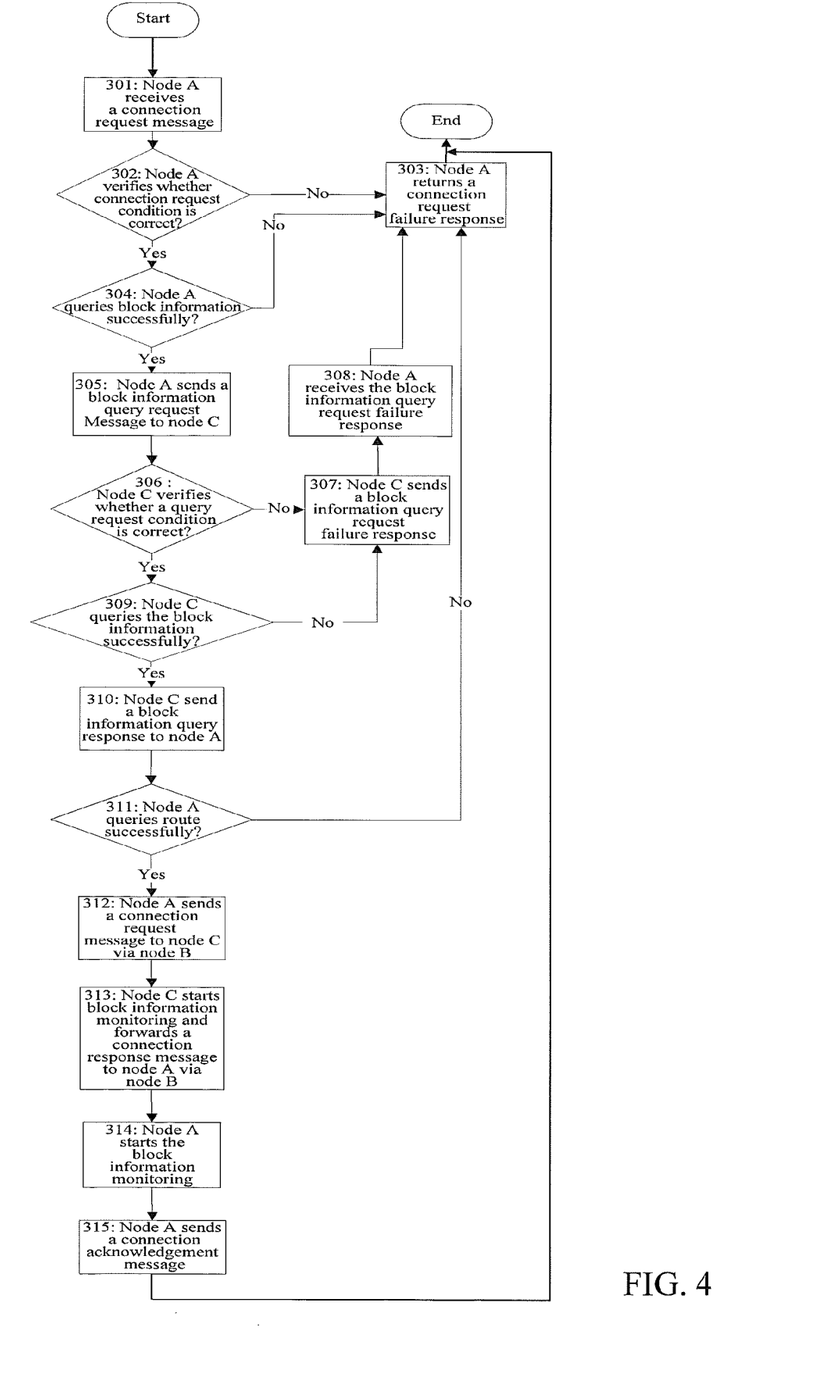
FIG. 4 is a flow chart in which a boundary node establishes a connection in the case of having resistance in accordance with an embodiment of the present invention.

FIG. 4 is a flow chart in which a boundary node establishes a connection in the case of block in accordance with an embodiment of the present invention comprising the following steps.

Step 301, a connection controller of node A receives a connection request message.

Step 302, the connection controller of node A verifies the connection request message, i.e., it mainly verifies whether a connection request condition is correct, and performs step 303 if the verification fails, otherwise step 304 is performed.

Step 303, the connection controller of node A returns a connection request failure response and the procedure ends.

Step 304, the connection controller of node A queries block information of an ingress subnet point, i.e., interchangeability between the ingress subnet point and other subnet points of node A in a route domain, from a link resource manager of node A, and performs step 303 when the query fails, i.e., when there is no ingress subnet point or there are no other subnet points in the route domain which are interchangeable with the ingress subnet point, otherwise step 305 is performed.

Step 305, the connection controller of node A sends a block information query request message to node C to query block information of an egress subnet point of node C.

Step 306, a connection controller of node C receives and verifies the block information query request message, i.e., it mainly verifies whether a query request condition is correct, and performs step 307 if the verification fails, otherwise step 309 is performed.

Step 307, the connection controller of node C sends a block information query request failure response to the connection controller of node A.

Step 308, the connection controller of node A performs step 303 after receiving the block information query request failure response.

Step 309, the connection controller of node C queries the block information of the egress subnet point from a link resource manager of node C, and performs step 307 if the query fails, otherwise step 310 is performed.

Step 310, the connection controller of node C fills the block information of the egress subnet point into a block information query response and returns it to the connection controller of node A.

Step 311, after receiving the block information query response, node A queries route information from a route controller by using the block information of the ingress subnet point of node A and the block information of the egress subnet point of node C as query conditions, and performs step 303 when the query fails, otherwise step 312 is performed.

Step 312, the connection controller of node A sends a connection request message to the next hop node B, which receives and processes the connection request message and forwards the connection request message to the next hop node C.

Step 313, the connection controller of node C notifies the link resource manager of node C to start block information monitoring after receiving and processing the connection request message, and then sends a connection response message to node B, which receives and processes the connection response message and forwards the connection response message to node A.

Step 314, the connection controller of node A notifies the link resource manager of node A to start the block information monitoring after receiving and processing the connection response message.

Step 315, node A sends a connection acknowledgement message, and the procedure ends.

Figure 5:
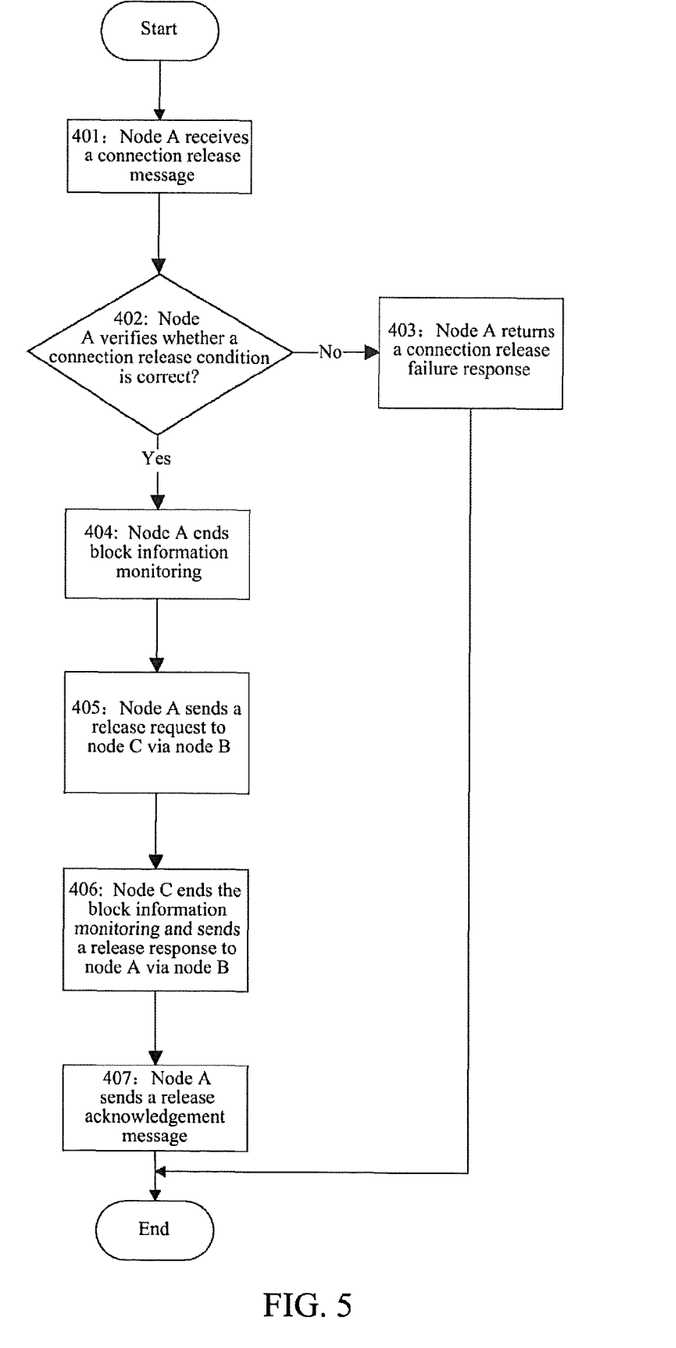
FIG. 5 is a flow chart in which the block boundary node releases a connection in accordance with an embodiment of the present invention.

Referring to FIG. 5, which is a flow chart in which a block boundary node releases a connection in accordance with an embodiment of the present invention comprising the following steps:

Step 401, the connection controller of node A receives a connection release message.

Step 402, the connection controller of node A verifies the connection release message, i.e., it mainly verifies whether a connection release condition is correct, and performs step 403 if the verification fails, otherwise step 404 is performed.

Step 403, the connection controller of node A returns a connection release failure response and the procedure ends.

Step 404, the connection controller of node A notifies the link resource manager of node A to end block information monitoring.

Step 405, the connection controller of node A sends a connection release request message to the next hop node B, which receives and processes the connection release request message and forwards the connection release request message to the next hop node C.

Step 406, the connection controller of node C notifies the link resource manager of node C to end the block information monitoring after receiving the connection release request message, and sends a connection release response message to node B after processing the connection release request message, and node B receives and processes the connection release response message and forwards the connection release response message to node A.

Step 407, the connection controller of node A receives and processes a connection release acknowledgement message and then sends the connection release acknowledgement message, and the procedure ends.

Figure 6:
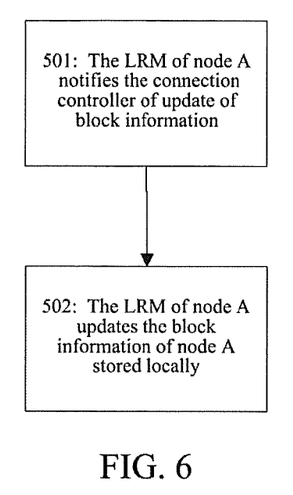
FIG. 6 is a flow chart of updating local block information when there are changes in block information of node A in accordance with an embodiment of the present invention.

Referring to FIG. 6, which is a flow chart of updating block information of the home terminal when there are changes in block information of node A in accordance with an embodiment of the present invention comprising the following steps:

Step 501, the link resource manager of node A notifies the connection controller of node A of update of block information of an ingress subnet point of node A when monitoring changes in block information of the ingress subnet point of the home terminal, for example, when there are connecting faults between a certain egress subnet point and the ingress subnet point.

Step 502, the connection controller of node A updates the block information of the ingress subnet point of node A stored locally after receiving a block information updating message of the ingress subnet point of node A, and the procedure ends.

Figure 7:
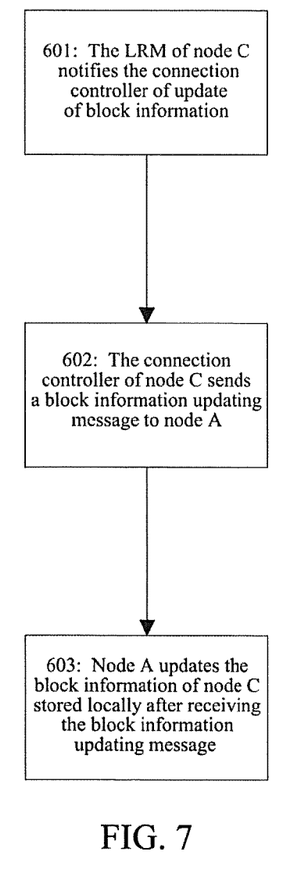
FIG. 7 is a flow chart of updating block information stored in node A when there are changes in block information of node C in accordance with an embodiment of the present invention.

Referring to FIG. 7, which is a flow chart of updating block information stored in node A when there are changes in block information of node C in accordance with an embodiment of the present invention comprising the following steps:

Step 601, the link resource manager of node C notifies the connection controller of node C of update of block information of an ingress subnet point of node C when monitoring changes in block information of the ingress subnet point of the home terminal.

Step 602, the connection controller of node C sends a block information updating message of an egress subnet point of node C to node A.

Step 603, the connection controller of node A updates the block information of the egress subnet point of node C stored locally after receiving the block information updating message of the egress subnet point of node C, and the procedure ends.

It is apparent that various modifications and variations to the present invention may be made by those skilled in the art without departing from the spirit and scope of the present invention. Thus, if such modifications and variations of the present invention fall within the scope of the claims of the present invention and equivalent technology thereof, then it is intended that the present invention also includes these modifications and variations.

The invention claimed is:

1. A block boundary node in an optical network, the block boundary node comprising a connection controller, a link resource manager and a route controller, wherein the connection controller is implemented by a processor and configured to send a block information query request to the link resource manager after receiving a connection request message, query and verify block information of an ingress subnet point of a home terminal, query block information of an egress subnet point of an egress boundary node after the verification is passed, and to send a route query request to the route controller by using the block information of the ingress subnet point of the home terminal and the block information of the egress subnet point of the egress boundary node as query parameters, wherein the block information of the ingress subnet point refers to interchangeability between the ingress subnet point and other subnet points of the home terminal in a route domain;

the link resource manager is implemented by the processor and configured to feed the block information of the ingress subnet point of the home terminal back to the connection controller in response to the block information query request of the connection controller; and the route controller is implemented by the processor and configured to provide route information for setting up a connection in response to the route query request.

2. The block boundary node according to claim 1, wherein the connection controller is further configured to update the block information stored in the home terminal after receiving a block information updating message of the home terminal.

3. The block boundary node accordance to claim 1, wherein the connection controller is further configured to receive a block information updating message of a distal boundary node and then update the block information of the egress boundary node stored in the home terminal according to the block information updating message of the distal boundary node.

4. A method for setting up a connection between block boundary nodes comprising the following steps:
   A. an ingress boundary node querying and verifying block information of an ingress subnet point of the ingress boundary node after receiving a connection setup request message, and sending a block information query request to an egress boundary node upon successful verification, wherein the block information of an ingress subnet point refers to interchangeability between the ingress subnet point and other subnet points of a home terminal in a route domain;
   B. the egress boundary node querying and verifying block information of an egress subnet point of the egress boundary node after receiving the block information query request, and sending the block information of the egress subnet point to the ingress boundary node upon successful verification;
   C. the ingress boundary node querying a route by using the block information of the ingress subnet point of the ingress boundary node and egress subnet point of the egress boundary node as query parameters, and sending a connection request message to the egress boundary node upon querying the route successfully; and
   D. the ingress boundary node receiving a connection acknowledgement message returned by the egress boundary node, thus the connection establishment is complete.

5. The method according to claim 4, wherein in the step A, the ingress boundary node verifies the connection setup request message after receiving the connection setup request message, queries and verifies the block information of the ingress subnet point if the verification is passed, and returns a connection request failure response if the verification is not passed, and the procedure ends.

6. The method according to claim 4, wherein
   in the step C, the egress boundary node starts block information monitoring after receiving the connection request message; and
   in the step D, the ingress boundary node starts the block information monitoring after receiving a connection acknowledgement message.

7. The method according to claim 6, further comprising after the connection is established, the ingress boundary node updating the block information of the ingress subnet point stored in a home terminal when monitoring changes in the block information of the ingress subnet point of the home terminal.

8. The method according to claim 6, further comprising: after the connection is established, the egress boundary node sending a block information updating message to the ingress boundary node when monitoring changes in the block information of the egress subnet point of a home terminal, and the ingress boundary node updating the block information of the egress subnet point of the egress boundary node stored in the home terminal according to the block information updating message.

9. The method according to claim 6, further comprising:
   the ingress boundary node receiving a connection release request and then ending the block information monitoring of a home terminal and sending the connection release request to the egress boundary node; and
   the egress boundary node ending the block information monitoring of the home terminal after receiving the connection release request and sending a connection release acknowledgement message to the ingress boundary node after processing the connection release request.

* * * * *